United States Patent [19]

Brown

[11] 4,294,622
[45] Oct. 13, 1981

[54] DRY WALL JOINT AND FINISHING COMPOUNDS

[75] Inventor: William F. Brown, Wausau, Wis.

[73] Assignee: Weston Research Corporation, Wausau, Wis.

[21] Appl. No.: 157,306

[22] Filed: Jun. 9, 1980

Related U.S. Application Data

[62] Division of Ser. No. 954,445, Oct. 25, 1978, Pat. No. 4,238,239.

[51] Int. Cl.$^3$ .............................................. C04B 11/14
[52] U.S. Cl. ..................................... 106/314; 106/116
[58] Field of Search ............... 106/111, 116, 314, 315; 260/29.6 S, 29.6 R, 42.44

[56] References Cited

FOREIGN PATENT DOCUMENTS

| | | | |
|---|---|---|---|
| 43-11109 | 5/1968 | Japan | 106/314 |
| 1390360 | 4/1975 | United Kingdom | 106/116 |
| 479743 | 11/1975 | U.S.S.R. | 106/315 |

*Primary Examiner*—James Poer
*Attorney, Agent, or Firm*—Michael, Best & Friedrich

[57] ABSTRACT

The dry wall joint compound, which can be used to completely close and fill joints between adjoining panel of gypsum dry wall board without a tape material, comprises a powdered mixture of gypsum, hydrated gypsum, calcium carbonate, plaster of paris, hydrated amorphous silica and talc. The dry wall joint compound can be admixed with water to provide a dry wall joint cement and preferably is admixed with a liquid additive composition comprising an aqueous mixture of zinc oxide, sodium acetate, ammonium alum, and an acrylic resin.

2 Claims, No Drawings

DRY WALL JOINT AND FINISHING COMPOUNDS

CROSS REFERENCE TO RELATED APPLICATIONS

This is a division of application Ser. No. 954,445 filed Oct. 25, 1978, now U.S. Pat. No. 4,238,239.

BACKGROUND OF THE INVENTION

This invention relates to dry wall joint compounds used to prepare dry wall joint cements and dry wall finishes.

When gypsum dry wall board or the like is used as a wall surfacing in construction projects, adhesive or cementitous fillers are usually used in combination with a tape material to close and fill the joints and corners between adjoining panels of the dry wall. Some of these fillers, and others with slightly modified formulations, are also used as finishes on dry wall surfaces.

In one widely used technique for filling dry wall joints, water is added to a gypsum joint filler compound to form a mud-like material which is applied with a trowel or the like to close the joint. A fiberglass, cloth or paper taping material is then stretched over the joint and embedded in the soft "mud". A overlayer or top dressing of the "mud" is applied over the taping material to completely fill the joint and provide a smooth surface. After setting, the top dressing usually must be sanded to smooth out irregularities prior to painting or applying a wall covering.

In addition to the multiple and time-consuming steps required for applying the tape and filler, many conventional wall board joint compounds have one or more of the following shortcomings: cannot be applied at subfreezing temperatures, requires up to 24–48 hours to completely harden, shrinks to some degree upon drying, requires an additional top dressing to completely fill the joint unless some excess is applied, and is vulnerable to cracking, particularly when used on prefabricated or panelized modular wall or ceiling structures transported from an assembly plant to construction sites.

SUMMARY OF THE INVENTION

A principal object of the invention is to provide a wall board joint compound which can be used as a joint cement or wall finish for dry walls and which is resistant to cracking and shrinkage.

A further object of the invention is to provide a wall board joint cement which can be used, without a taping material, to completely fill the joints between adjoining panels in a one-step operation.

A further object of the invention is to provide a liquid additive composition which can be conveniently admixed with various wall board joint compounds to produce a cement having the capabilities described in the preceding paragraphs.

Other objects, aspects and advantages of the invention will become apparent to those skilled in the art upon reviewing the following detailed description and appended claims.

The wall board joint compound provided in accordance with one aspect of the invention comprises a powdered mixture of gypsum, hydrated gypsum, calcium carbonate, plaster of paris, hydrated amorphous silica, and talc. This wall board joint compound can be admixed with appropriate amounts of water and used as finish for dry walls or as a joint cement.

The liquid additive composition provided in accordance with another aspect of the invention comprises an aqueous mixture of zinc oxide, sodium acetate, ammonium alum, an acrylic resin and water. This liquid additive composition preferably is admixed with the above wall board joint compound to form a joint cement, but also can be mixed with a gypsum-based dry wall joint filler to provide a joint cement having the capability of completely filling wall board joints in a one-step operation without a taping material.

DESCRIPTION OF THE PREFERRED EMBODIMENTS

The wall board joint compound of the invention comprises a powdered mixture of gypsum, a hydrated gypsum, calcium carbonate, plaster of paris, hydrated amorphous silica, and talc.

The wall board joint compound can be mixed with appropriate amounts of water to provide a creamy or mud-like, spreadable material which can be applied to dry wall surfaces (as is or with the addition of an aggregate) in a conventional manner to provide a finish of desired texture to the otherwise smooth wall surface. This material can also be used as a joint cement as is or in conjunction with a conventional tape material. Accordingly, the term "wall board joint compound" as used herein (including the claims) encompasses a compound suitable for use as a joint cement and dry wall finish and the term "joint cement" encompasses a mixture of the joint compound and a liquid which is suitable for use as a joint cement and a finish for wall board and the like.

The wall board joint compound preferably contains about 27 to about 41 weight % gypsum, about 24 to about 38 weight % hydrated gypsum, about 16 to about 26 weight % calcium carbonate, about 5 to about 9 weight % plaster of paris, about 4 to about 6 weight % hydrated amorphous silica, and about 1 to about 3 weight % talc, all based on the total weight of the powdered mixture.

A wall board joint compound particularly adaptable for use in the preparation of a joint cement contains about 34 weight % gypsum, about 31 weight % hydrated gypsum, about 21 weight % calcium carbonate, about 7 weight % plaster of paris, about 5 weight % hydrated amorphous silica, and about 2 weight % talc.

The liquid additive composition of the invention comprises an aqueous mixture containing about 0.35 to about 8 weight % zinc oxide, about 0.35 to about 1.5 weight % sodium acetate, about 0.35 to about 3 weight % ammonium alum and about 0.35 to about 8 weight % of an acrylic resin, all based on the total weight of the aqueous mixture. The mixture usually contains about 80 to about 98 weight % water.

The zinc oxide, sodium acetate and ammonium alum preferably are used in the powdered form. For best results, these ingredients should be finely-divided, preferably in the order of about 300–320 screen mesh.

Various commercially available acrylic resins commonly used in latex paint formulations, such as Acryloid coating resin (acrylic ester polymers) solutions supplied by Rhom & Haas and UCAR 366 supplied by Union Carbide (an acrylic resin synthetic latex emulsion), can be employed in the liquid additive composition. These resins typically are supplied as an emulsion or dispersion containing about 30–40% solids. When such an emulsion or dispersion is used, the zinc oxide, sodium acetate and ammonium alum can be mixed therewith first and the resulting mixture added to and thoroughly mixed with sufficient water to make 100 parts by weight of the composition.

In a preferred embodiment, the liquid additive composition is admixed with the wall board joint compound of the invention to produce a joint cement which can be applied in a one-step operation to completely close and fill the joints and corners between dry wall panels and provide a smooth surface without the necessity for a tape material or top dressing.

The total effect of each ingredient in the liquid additive composition to the overall combination and its interrelationship with other ingredients in the liquid additive composition and/or the dry wall joint compound are not fully understood. However, some general observations have been made. The zinc oxide serves primarily as a thickener. The sodium acetate accelerates curing of the resulting cement to the B-stage, thereby facilitating complete filling of the joints and final dressing in a one-step operation without a tape material. The ammonium alum serves primarily to regulate the final hardening or curing of the cement. The acrylic resin imparts elasticity or flexibility to the hardened cement as well as lubricity to facilitate application and finish smoothing of the green cement with a trowel or the like.

A particularly preferred formulation for the liquid additive composition includes about 0.7 weight % zinc oxide, about 0.7 weight % sodium acetate, about 0.7 weight % of ammonium alum, about 0.7 weight % of the acrylic resin, and about 90 weight % water.

The joint cement can be conveniently applied at temperatures as low as 15° F. and hardens without appreciable shrinking. The hardened cement has sufficient elasticity or flexibility to withstand the application of various differential forces on adjoining dry wall panels without cracking. This characteristic is particularly advantageous because conventional 4 ft. × 8 ft. sheets of gypsum dry wall can be used in the construction of panelized or modular wall or ceiling structures for prefabricated buildings which must be transported long distances from the assembly plant to the construction site. Use of gypsum dry wall board for such wall structures heretofore has been limited because the joints between adjoining panels filled with prior art joint compounds tend to crack during handling and transportation. Consequently, more expensive pressed fiber board several feet in length often has been used. Also, the hardened cement does not chalk under normal conditions and can be painted over with conventional oil, acrylic or latex base paints. Furthermore, it can withstand temperatures up to about 900°–960° F. without cracking.

While the liquid additive composition and the wall board joint compound can be admixed by any of a variety of suitable techniques which provides thorough mixing, use of a slow mulling-type blender is preferred. The mixture (weight) ratio of the wall board joint compound to the liquid additive composition is varied to provide a joint cement having a consistency best suited for the particular type joint and the method used for application. Generally, this mixture ratio is about 0.5:1 to about 6:1.

A creamy, spreadable consistency usually is preferred when the joint cement is to be applied with a trowel or similar means. When the joint cement of such consistency is applied with a trowel, one having limited skill can, in one operation, completely close and fill a joint and feather the top surface so that little or no sanding is required before painting. The joint cement usually cures to a completely hardened state within about 4 to 5 hours depending on the ambient relative humidity and temperature.

The liquid additive composition can be admixed with a gypsum-based dry wall joint filler to provide a spreadable material which can be used as a joint cement or a dry wall finish. The resulting cement does not have all the advantageous characteristics of the cement prepared from the liquid additive composition and the wall board joint compound of the invention. In particular, it is somewhat less elastic or flexible and more susceptible to cracking. However, it is acceptable for many applications where the joints are not subjected to crack-causing forces, such as stationary wall structures. For best results, the gypsum-based dry wall joint filler with which the liquid additive composition is admixed preferably contains about 5 to about 15 weight % of a mica, most preferably about 8 weight %, based on the total weight. Lithium mica is preferred.

The liquid additive composition and a gypsum-based dry wall joint filler can be mixed together in the same general proportions and in the same general manner described above.

Without further elaboration, it is believed that one skilled in the art can, using the preceding description, utilize the present invention to its fullest extent. The following examples are presented to exemplify preferred embodiments of the invention and should not be construed as limitations thereof.

EXAMPLE I

A powdered wall board joint compound was prepared with the following formulation:

| INGREDIENT | WEIGHT % |
| --- | --- |
| Gypsum | 34 |
| Hydrated gypsum[1] | 31 |
| Calcium carbonate | 21 |
| Plaster of paris | 7 |
| Hydrated amorphous silica[2] | 5 |
| Talc | 2 |
|  | 100 |

Notes:
[1] Autoclaved Hydrocal supplied by U.S. Gypsum Co.
[2] Hi-Sil 422, supplied by PPG All the ingredients were about 300 screen mesh or smaller.

One gallon of a liquid additive composition of the invention having the following formulation was prepared for use with 25 pounds of the above dry wall board joint compound:

| INGREDIENT | WEIGHT % |
| --- | --- |
| Zinc oxide | 1 ounce |
| Sodium acetate (anhydrous) | 1 ounce |
| Ammonium alum | 1 ounce |
| Acrylic resin emulsion[1] (34% solids) | 3 ounces |
| Water | enough to make 1 gallon |

Notes:
[1] UCAR 366 (an acrylic resin synthetic latex emulsion), supplied by Union Carbide The zinc oxide, sodium acetate, ammonium alum and acryloid resin were first thoroughly mixed together and the water was then added and thoroughly mixed.

EXAMPLE II

Two sheets of 4 ft.×8 ft. gypsum wall board were placed at 90° to each other to simulate a wall corner. A creamy, spreadable joint cement was prepared by mixing about 15 to 35 parts of the liquid additive of Example I with about 65 to 85 parts of the wall board joint compound of Example I. The resulting joint cement was used to bond the two sheets together and to completely fill the joint without a tape material.

After the joint cement was allowed to harden at room temperature (about 20-30 minutes), the simulated corner structure was placed in a heating chamber and heated to about 500° F. for 5 hours. The joint between the panels was visually inspected and there was no evidence of cracking.

After cooling, a 22 pound, perpendicular pushing force was applied simultaneously to each panel in an attempt to force them apart. The corner joint remained in tact; however, one of the panels snapped and the paper portion thereof tore at about 2 inches from the corner joint.

EXAMPLE III

A joint cement prepared in the manner described in Example II was used to close and fill the joint beteen two 2 ft.×2 ft. panels of gypsum wall board without a tape material. After the cement had hardened, the resulting structure was cyclically heated to 90° F. and allowed to cool to room temperature 15 times. The joint was visually inspected and there was no evidence of cracking.

EXAMPLE IV

Simulated wall panels were constructed by nailing a 4 ft.×8 ft. sheet of tapered SW gypsum wall board onto a 4 ft.×8 ft. rectangular frame constructed from wood 2×4's. Two of these simulated wall panels were fastened together along one long edge. A joint cement prepared in the manner described in Example II was troweled into the joint between the adjoining sheets of wall board to completely fill the joint and provide a smooth feathered surface without a tape material.

The resulting structure was placed in a mechanism designed to simulate the type of forces which can be exerted on a modular wall structure for prefabricated buildings during handling and over-the-road transportation from an assembly plant to a construction site. This mechanism cyclically racked the opposite corners of the structure in opposite directions through a total travel of 5-9 inches which is considerably more severe than the conditions expected during normal handling and transportation. After 70 cycles of such racking, there was no evidence of cracking in the joint.

EXAMPLE V

Two 2 ft.×4 ft. sheets of gypsum wall board were nailed onto a 4 ft.×4 ft. rectangular frame constructed from wood 2×4's. The adjoining long edges of the two sheets extending across the middle of the frame were unsupported. A joint cement prepared in the manner described in Example II was applied with a trowel to fill the joint and provide a smooth feathered surface without a tape material. The frame was placed on the floor and a 300 pound dead weight having a surface area of 400 square inches was centered on the joint. The joint was inspected at two different times afterwards and was found to be in tact after 9 hours but cracked some time between the inspection and one made 24.5 hours later.

From these test results, it can be seen that a joint cement prepared by mixing the wall board joint compound and the liquid additive composition of the invention is capable of providing a crack-resistant joint having superior strength characteristics without a tape material.

From the foregoing description, one skilled in the art can easily ascertain the essential characteristics of the invention and, without departing from the spirit and scoop thereof, can make various changes and modifications to adapt it to various usages and conditions.

I claim:

1. A liquid additive composition for admixing with a wall board joint compound to provide a joint cement, said liquid additive composition comprising an aqueous mixture containing about 0.35 to about 8 weight % zinc oxide, about 0.35 to about 1.5 weight % sodium acetate, about 0.35 to about 3 weight % ammonium alum, and about 0.35 to about 8 weight % of an acrylic resin, based on the total weight of the aqueous mixture.

2. A liquid additive composition according to clam 1 containing about 0.7 weight % zinc oxide, about 0.7 weight % sodium acetate, about 0.7 weight % ammonium alum, and about 0.7 weight % of the acrylic resin.

* * * * *